United States Patent [19]

Elser et al.

[11] 4,368,794
[45] Jan. 18, 1983

[54] AUXILIARY POWER STEERING FOR MOTOR VEHICLES

[75] Inventors: Dieter Elser, Essingen-Lauterburg; Heinrich Holub, Schwabisch Gmund, both of Fed. Rep. of Germany

[73] Assignee: Zahnradfabrik Friedrichshafen, AG, Friedrichshafen, Fed. Rep. of Germany

[21] Appl. No.: 148,046

[22] Filed: May 8, 1980

[30] Foreign Application Priority Data

May 11, 1979 [DE] Fed. Rep. of Germany ....... 2918975

[51] Int. Cl.³ .......................... B62D 5/08; B62D 5/10
[52] U.S. Cl. .................................. 180/133; 180/152; 91/375 A; 91/523
[58] Field of Search .............. 180/146, 147, 152, 153, 180/133; 91/523, 521, 522, 524, 375 A

[56] References Cited

U.S. PATENT DOCUMENTS

| 3,180,233 | 4/1965 | Jablonsky | 180/146 |
| 3,602,101 | 8/1971 | Jablonsky | 180/146 |
| 3,822,759 | 7/1974 | Sheppard | 180/133 |
| 4,186,818 | 2/1980 | Jablonsky | 180/133 |
| 4,189,024 | 2/1980 | Jablonsky | 91/375 A |

FOREIGN PATENT DOCUMENTS 2637458 8/1976 Fed. Rep. of Germany .

Primary Examiner—John A. Pekar
Attorney, Agent, or Firm—Zalkind & Shuster

[57] ABSTRACT

A power steering gear assembly having a single control valve suitable for use in a single circuit type of power steering system, may be simply converted to use in a two-circuit type of power steering system by replacement of the steering spindle and the addition of a housing extension enclosing a second control valve formed on the replaced steering spindle. Both control valves include portions of the common steering spindle and control sleeves rotatable thereon, with one of the control sleeves being formed in one piece with the worm shaft of the steering gear assembly.

6 Claims, 2 Drawing Figures

AUXILIARY POWER STEERING FOR MOTOR VEHICLES

BACKGROUND OF THE INVENTION

This invention relates to auxiliary power steering systems of the dual power type wherein two separate servomotors respectively supplied with pressurized fluid from separate pumps through separate control circuits jointly perform the vehicle steering operation in response to rotation of a common steering spindle associated with one steering gear assembly through which the supply and exhaust of fluid to both servomotors is controlled.

The foregoing type of auxiliary power steering system is generally well known, as disclosed for example in U.S. Pat. No. 3,822,759. In this type of auxiliary power steering system, two mutually separated hydraulic steering circuits are controlled by means of a common steering spindle. One steering control circuit is associated with a steering gear assembly within which one of the servomotors is located drivingly connected through gear and steering linkages to the dirigible wheels of the vehicle. The other steering circuit is associated with a second control valve coaxial with the first control valve for operation of the second servomotor with which gearing and steering linkages are also associated for joint powered steering of the vehicle. Separate servo pumps and reservoirs are assigned to the two steering control circuits.

It is therefore an important object of the present invention to provide an auxiliary power steering system of the foregoing type that may be manufactured in an economic fashion for use in a dual power system and with little change for use in a single circuit power steering system. A further object is to provide an auxiliary power steering system that is compact in both its axial and radial extent.

SUMMARY OF THE INVENTION

In accordance with the present invention, two rotatable slide valves are coupled to each other in series for supply and exhaust of pressurized fluid from separate pumps to two servomotors through which a jointly powered steering operation is effected. The two rotatable slide valves are physically separated from each other by the steering gear housing assembly associated with one of the servomotors enclosing only one of the rotatable slide valves so that the other control valve may be simply added to an existing single circuit steering gear assembly. In this manner, one type of steering gear assembly may be constructed and assembled more economically for both single and two-circuit steering systems. Further, a two-circuit type of auxiliary power steering gear assembly may be constructed in a compact fashion. It should be appreciated that the lower priced one-circuit steering system is often produced in larger quantities by a manufacturer as the main product. Utilizing this main product, it may be easily and economically expanded for use in a dual powered, two-circuit steering system to thereby provide a considerable price advantage for customers desiring the two-circuit steering system.

BRIEF DESCRIPTION OF THE DRAWING FIGURES

A specific embodiment of the invention is explained in greater detail hereinafter with reference to the accompanying drawings, wherein:

FIG. 1 is a longitudinal section view through a steering gear assembly with associated components schematically illustrated forming a two-circuit steering system in accordance with one embodiment of the present invention, and FIG. 2 is a longitudinal section view similar to FIG. 1 but showing a single circuit steering gear assembly which may with simple addition and modification be utilized for the dual power steering system as shown in FIG. 1.

DETAILED DESCRIPTION OF PREFERRED EMBODIMENT

Figure 1:
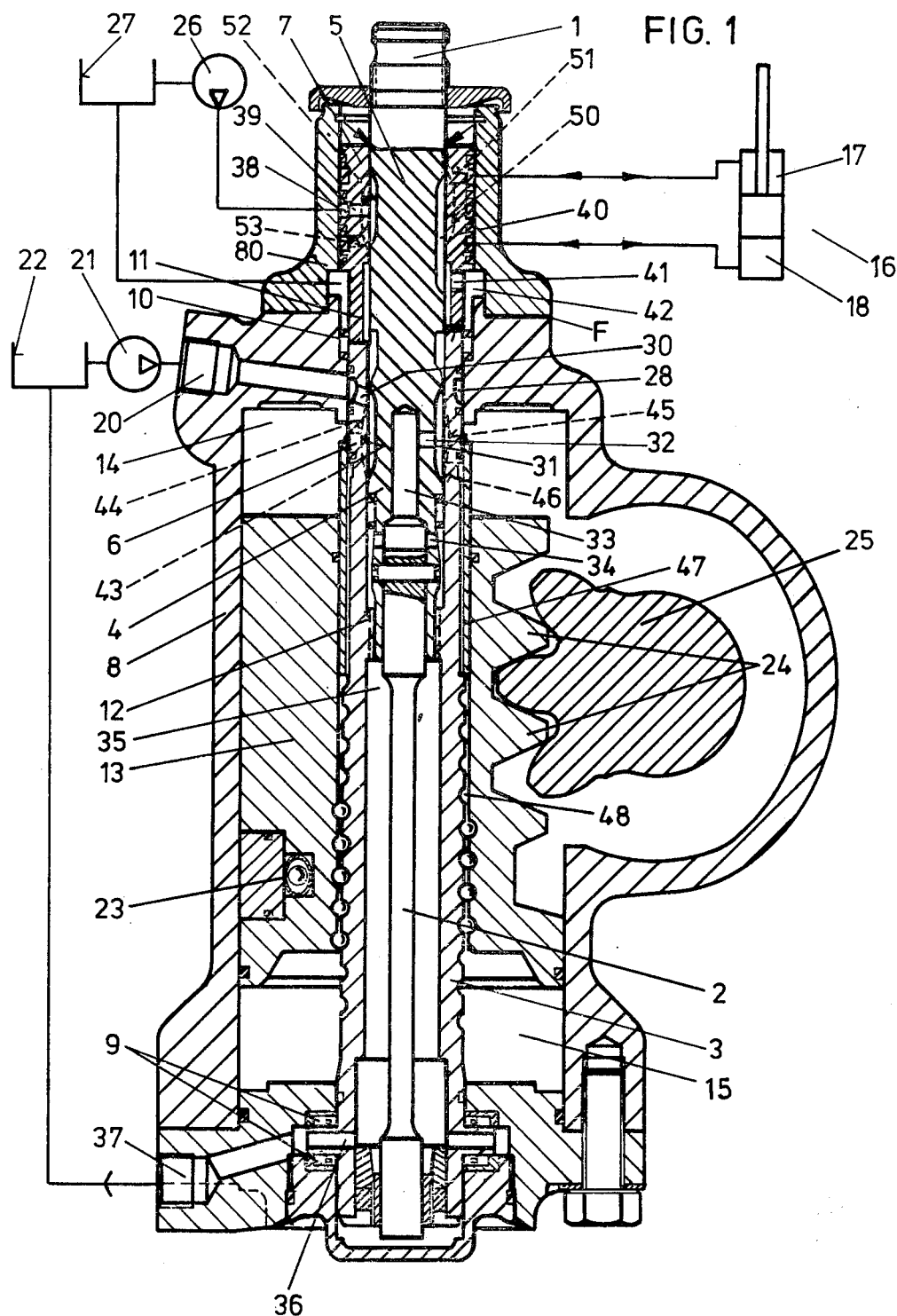

Referring now to the drawings in detail, FIG. 1 illustrates a two-circuit fluid power steering gear assembly constructed in accordance with the present invention. The steering gear assembly is drivingly connected to a hand steering wheel (not shown) of an automotive vehicle by means of a steering spindle 1 projecting from one end of a steering gear housing 8. The steering spindle is operative to control a dual power type of vehicle steering system through the steering gear assembly, which includes a torsion rod 2 torsionally coupling the steering spindle to a tubular worm drive shaft 3. The worm shaft 3 extends in coaxial overlapping relation to an inner end portion 4 of the steering spindle which forms part of a first rotatable slide valve having a control sleeve 6 formed in one piece with the worm shaft at one axial end. The opposite axial end of the worm shaft is coupled to the torsion rod 2. A portion 5 of the steering spindle projecting axially from one end of the housing 8 forms part of a second rotatable slide valve having a control sleeve 7 associated therewith. The sleeve 7 is mounted in coaxial relation to the spindle 1 within a housing extension 80 having a flange portion secured by screw fasteners, for example, to the end of the housing 8 at axial location F from which the steering spindle projects.

The sleeve 7 while formed as a separate piece, is rotationally fixed to the end of the worm shaft 3, at which the sleeve 6 is formed, by means of a connecting portion 11 projecting into recess 10 in sleeve 6 and rotationally supported in the housing 8 by axial thrust bearings 9. Relative angular movement between the worm shaft and the steering spindle is limited by a lost motion connection 12. Within the limits established by the connection 12, relative rotation of the spindle and the worm shaft is elastically resisted by the torsion rod to initiate operation of a servomotor 15 and a servomotor piston 13 reciprocally mounted within the housing 8. The piston 13 has an axial bore through which the worm shaft 3 extends. The housing 8 encloses opposed pressure chambers 14 and 15 at opposite axial ends of the piston 13 to which pressurized fluid is supplied and exhausted under control of the first rotatable slide valve 4–6. The second rotatable slide valve 5–7 controls the supply and exhaust of pressurized fluid to opposed pressure chambers 17 and 18 of servomotor 16, as schematically illustrated in FIG. 1.

The first rotatable slide valve 4–6 is in fluid communication through a housing mounted passage 20 with a pump 21 operated by the vehicle engine. Pump 21 intakes fluid from a reservoir tank 22. Operation of the rotatable slide valve 4–6 is generally well known, as disclosed, for example, in U.S. Pat. No. 4,232,586.

The operating piston 13 which is acted upon by pressurized fluid under control of the first rotatable slide valve 4–6, is in meshing engagement with the worm shaft 3 by means of spiral gearing including a ball transmitting train 23. Further, the operating piston 13 has rack teeth 24 in mesh with sector gears on a steering gear segment 25 connected to a steering arm shaft (not shown). The steering arm shaft thereby connects the piston servomotor through a steering linkage to the dirigible wheels of the vehicle.

The second rotatable slide valve 5–7 is in fluid communication with a separate pump 26 which draws fluid from a reservoir tank 27. Pump 26 is also driven by the vehicle engine. The servomotor 16 like the first servomotor hereinbefore described, is drivingly connected to the same dirigible wheels of the vehicle for jointly powering the steering operation.

In the neutral position of the steering gear assembly, fluid is displaced by pump 21 through the housing passage 20, annular groove 28 and several bores 30 into axial valve passage grooves 31 formed in the valve portion 6 of the steering spindle. From grooves 31, the pressurized fluid is conducted to a central bore 33, through a cross bore in the valve portion 6 of the spindle. An additional cross bore 34 conducts fluid from bore 33 through the lost motion connection 12 to internal space 35 of the worm shaft 3. Finally, the fluid returns to the reservoir tank 22 through an annular chamber 36 in communication with space 35 and a discharge port 37 in the housing. Fluid is simultaneously displaced by the pump 26 through axial grooves 40 in the valve portion 5 of the spindle, through an annular passage 38 and several radial bores 39 in the control sleeve 7, the fluid being conducted through a cross bore 41 in the control sleeve and an annular chamber 42 to the reservoir tank 27. Thus, the fluid displaced by both pumps 21 and 26 is freely recirculated in the neutral position of the steering gear assembly.

In response to turning of the steering spindle 1 in either direction, pressurized fluid flows from the pump 21 through axial grooves 43 and bores 44 in the control sleeve 6 into the pressure chamber 14, or through another set of axial grooves 45, bores 46, an annular passage 47 and spindle mounted thread passages 48 into the pressure chamber 15. Pressurized fluid is delivered at the same time by the pump 26 to the pressure chamber 17 through grooves 50 and bores 51 in the valve control sleeve 7 or to pressure chamber 18 through additional axial grooves 52 and bores 53. The operating piston 13, axially displaceable within the steering gear housing 8, and the operating piston of the servomotor 16, undergo movement that is synchronized by virtue of the slide valves being coupled because of the valve portions 4 and 5 thereof being formed in the common steering spindle. The two steering control circuits respectively controlled by the slide valves are nevertheless completely separated from each other. In the event one of the two pumps 21 and 26 fails, steering with some power assistance is continued through operation of the circuit associated with the pump that remains fully operative, although the steering operation will require a greater manual effort.

The formation of two valve groove passage systems on the valve portions 4 and 5 of the common steering spindle 1, is beneficial from a manufacturing standpoint.

The required valve grooves may be produced, for example, in one operation with the same tool, as a result of which a qualitative improvement is achieved. Further, relative angular positioning of the two slide valves is predetermined during manufacture so that subsequent adjustment of the control valves may be eliminated.

Figure 2:
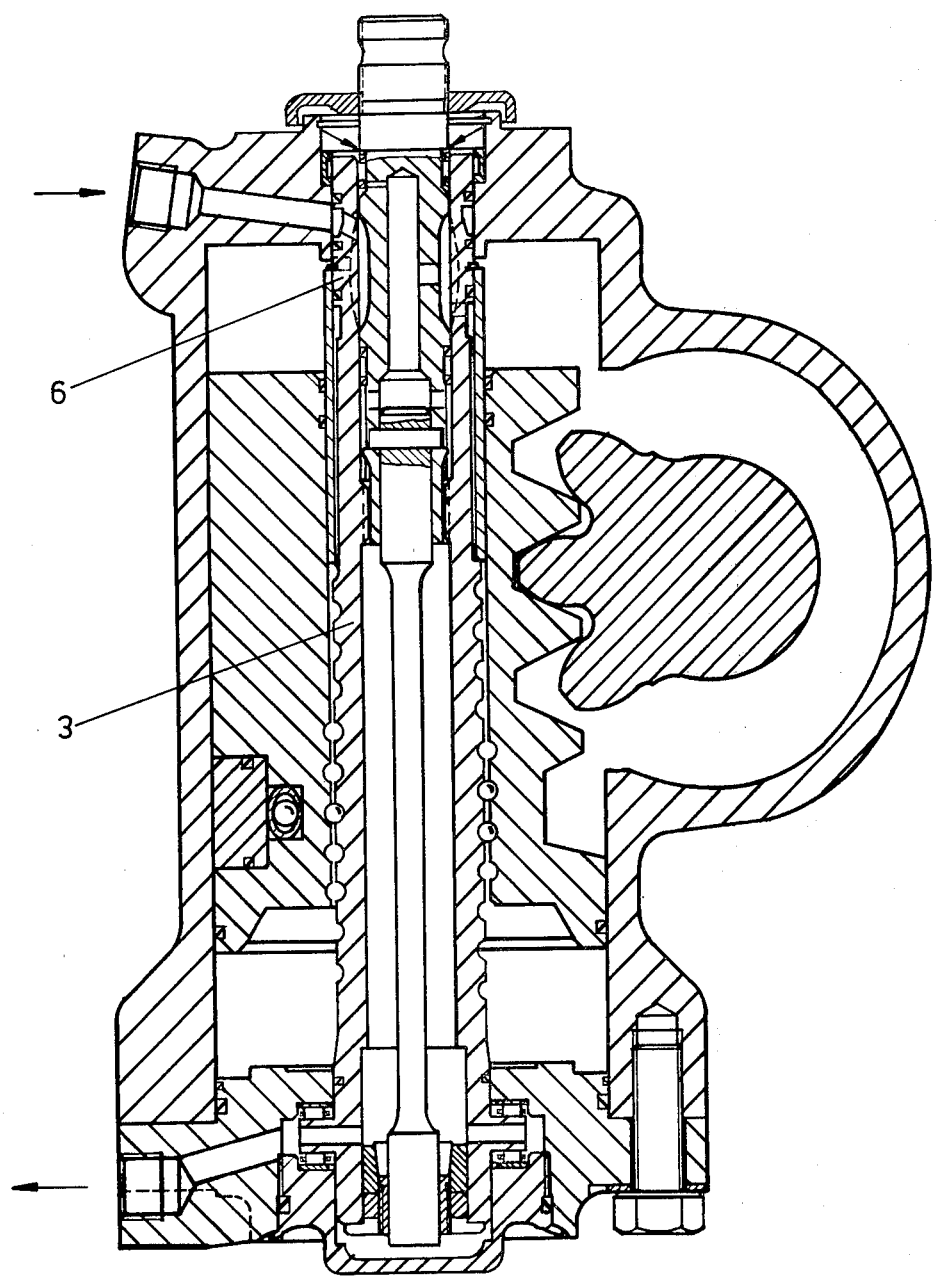

FIG. 2 illustrates an auxiliary power steering gear assembly of the type having a single steering control circuit now in common use. This steering gear assembly may be manufactured with the same parts as hereinbefore described with respect to FIG. 1, except that a different steering spindle is utilized having only one valve groove passage system. The steering worm shaft 3 formed in one piece with the valve control sleeve, is still utilized. However, the flanged housing extension 80 associated with the embodiment of FIG. 1, is omitted. Thus it will be apparent that a steering gear assembly may be manufactured in accordance with the present invention for use in a single control circuit system and with the simple addition of a housing extension 80 and replacement of the steering spindle it may service a dual power steering system.

What is claimed is:

1. For use in a dual power steering system having two separate servomotors (13 and 16) respectively supplied with pressurized fluid from separate pumps (21 and 26) through separate control circuits to jointly perform vehicle steering operations in response to rotation of a common steering spindle (1) rotatably mounted within and axially projecting from a steering gear housing (8) associated with one of the servomotors (13), a steering control valve assembly comprising, first rotatable valve means (4–6) mounted within the housing on said common steering spindle for controlling said supply of fluid from one of the pumps (21), and second rotatable valve means (5–7) mounted on said common steering spindle in axially spaced relation to said first valve means for controlling said supply of fluid from the other of the pumps (26), said first and second rotatable valve means including control sleeves (6, 7) rotatable on the spindle, and axial passages (31, 40) formed in the spindle in operative relation to the control sleeves, and a tubular drive shaft (3) driven by said one of the servomotors (13) and coupled to said control sleeves in coaxial relation to the common steering spindle.

2. The combination as defined in claim 1, wherein said one of the servomotors includes a piston (13) reciprocably mounted within the steering gear housing, and means (23) drivingly connecting the tubular shaft to the piston for rotation thereof in response to reciprocation of the piston, control sleeve (6) of said first valve means being formed in one piece with said tubular shaft.

3. For use in a dual power steering system having two separate servomotors (13 and 16) respectively supplied with pressurized fluid from separate pumps (21 and 26) through separate control circuits to jointly perform vehicle steering operations in response to rotation of a common steering spindle (1) rotatably mounted within and axially projecting from a steering gear housing (8) associated with one of the servomotors (13), a steering control valve assembly comprising, first rotatable valve means (4–6) mounted within the housing on said common steering spindle for controlling said supply of fluid from one of the pumps (21), second rotatable valve means (5–7) mounted on said common steering spindle externally of the housing in axially spaced relation to said first valve means and operatively coupled thereto for controlling said supply of fluid from the other of the pumps (26), and auxiliary housing means (80) for enclosing the second valve means in coaxial relation to the common steering spindle, said one of the servomotors including a piston (13) reciprocably mounted within the steering gear housing, a tubular shaft (3) torsionally coupled to the steering spindle within the housing and means (23) drivingly connecting the tubular shaft to the piston for rotation thereof in response to reciprocation of the piston, said first valve means including a control valve sleeve (6) formed in one piece with said tubular shaft, said first and second valve means further including axial passage grooves (31,40) formed in the common steering spindle.

4. The steering control valve assembly as defined in claim 3, wherein said auxiliary housing means comprises a tubular housing extension having a flanged portion secured to the steering gear housing.

5. The steering control valve assembly as defined in claim 3, wherein said second valve means includes a control valve sleeve (7) coaxially mounted on the common steering spindle and rotationally coupled to the tubular shaft.

6. A steering gear assembly for a dual power steering system, including a housing (8), a steering spindle (1) rotatably mounted within the housing and projecting axially therefrom, a tubular drive shaft (3) rotatably mounted in coaxial relation to the steering spindle and torsionally coupled thereto within the housing, a first control valve (4–6) mounted on the steering spindle within the housing, and a second control valve (5–7) mounted on the steering spindle in axially spaced relation to the first control valve, each of said control valves including a control sleeve (6, 7) rotatably mounted on the steering spindle and an axial passage groove (31,40) formed in the steering spindle in operative relation to the associated control sleeve, one of said control sleeves (6) being formed in one piece with the tubular drive shaft and means (11) coupling the other of the control sleeves (7) to the tubular drive shaft for rotation therewith.

* * * * *